US008421872B2

(12) United States Patent
Neven, Sr.

(10) Patent No.: US 8,421,872 B2
(45) Date of Patent: Apr. 16, 2013

(54) IMAGE BASE INQUIRY SYSTEM FOR SEARCH ENGINES FOR MOBILE TELEPHONES WITH INTEGRATED CAMERA

(75) Inventor: Hartmut Neven, Sr., Aachen (DE)

(73) Assignee: Google Inc., Mountain View, CA (US)

( * ) Notice: Subject to any disclaimer, the term of this patent is extended or adjusted under 35 U.S.C. 154(b) by 2991 days.

(21) Appl. No.: 10/783,378

(22) Filed: Feb. 20, 2004

(65) Prior Publication Data
US 2005/0185060 A1 Aug. 25, 2005

(51) Int. Cl.
H04N 5/235 (2006.01)
H04N 5/228 (2006.01)
H04N 5/76 (2006.01)

(52) U.S. Cl.
USPC ........................... 348/222.1; 348/231.2

(58) Field of Classification Search .................. 348/161, 348/231.2, 222.1; 382/165, 162, 170, 181, 382/182, 118, 305, 306, 209, 218, 224
See application file for complete search history.

(56) References Cited

U.S. PATENT DOCUMENTS

| | | | | |
|---|---|---|---|---|
| 5,579,471 A | * | 11/1996 | Barber et al. | 715/700 |
| 5,615,324 A | * | 3/1997 | Kuboyama | 345/441 |
| 5,724,579 A | * | 3/1998 | Suzuki | 707/104.1 |
| 5,768,633 A | * | 6/1998 | Allen et al. | 396/2 |
| 5,884,247 A | | 3/1999 | Christy | |
| 5,926,116 A | * | 7/1999 | Kitano et al. | 340/988 |
| 6,023,241 A | | 2/2000 | Clapper | |
| 6,055,536 A | * | 4/2000 | Shimakawa et al. | 707/101 |
| 6,148,105 A | | 11/2000 | Wakisaka et al. | |
| 6,181,817 B1 | * | 1/2001 | Zabih et al. | 382/170 |
| 6,208,626 B1 | | 3/2001 | Brewer | |
| 6,272,231 B1 | | 8/2001 | Maurer et al. | |
| 6,301,370 B1 | | 10/2001 | Steffens et al. | |
| 6,393,147 B2 | * | 5/2002 | Danneels et al. | 382/165 |
| 6,470,264 B2 | * | 10/2002 | Bide | 701/207 |
| 6,504,571 B1 | * | 1/2003 | Narayanaswami et al. | 348/231.99 |
| 7,016,532 B2 | * | 3/2006 | Boncyk et al. | 382/165 |
| 2001/0032070 A1 | | 10/2001 | Teicher | |
| 2002/0049728 A1 | * | 4/2002 | Kaku | 707/1 |
| 2002/0055957 A1 | * | 5/2002 | Ohsawa | 707/513 |
| 2002/0089524 A1 | * | 7/2002 | Ikeda | 345/672 |
| 2002/0101568 A1 | | 8/2002 | Eberl et al. | |

(Continued)

FOREIGN PATENT DOCUMENTS

DE 101 10 979 A1 9/2002
EP 0 944 019 A2 9/1999

(Continued)

OTHER PUBLICATIONS

PCT WO 03/041000, Boncyk et al, May 15, 2003.*

(Continued)

*Primary Examiner* — Nicholas Giles
(74) *Attorney, Agent, or Firm* — Remarck Law Group PLC

(57) ABSTRACT

An increasing number of mobile telephones and computers are being equipped with a camera. Thus, instead of simple text strings, it is also possible to send images as queries to search engines or databases. Moreover, advances in image recognition allow a greater degree of automated recognition of objects, strings of letters, or symbols in digital images. This makes it possible to convert the graphical information into a symbolic format, for example, plain text, in order to then access information about the object shown.

31 Claims, 2 Drawing Sheets

U.S. PATENT DOCUMENTS

| | | | |
|---|---|---|---|
| 2002/0102966 A1* | 8/2002 | Lev et al. ................... | 455/412 |
| 2002/0103813 A1* | 8/2002 | Frigon ...................... | 707/104.1 |
| 2002/0140988 A1* | 10/2002 | Cheatle et al. ............. | 358/402 |
| 2002/0156866 A1* | 10/2002 | Schneider .................. | 709/218 |
| 2002/0184203 A1 | 12/2002 | Naster et al. | |
| 2002/0187774 A1 | 12/2002 | Ritter et al. | |
| 2003/0044068 A1 | 3/2003 | Kagehiro et al. | |
| 2003/0044608 A1 | 3/2003 | Yoshizawa et al. | |
| 2003/0164819 A1 | 9/2003 | Waibel | |
| 2004/0004616 A1 | 1/2004 | Konya et al. | |
| 2004/0208372 A1* | 10/2004 | Boncyk et al. ............. | 382/181 |
| 2005/0041862 A1 | 2/2005 | Lo | |
| 2006/0012677 A1 | 1/2006 | Neven et al. | |
| 2006/0026202 A1 | 2/2006 | Isberg et al. | |

FOREIGN PATENT DOCUMENTS

| | | | |
|---|---|---|---|
| WO | WO 01/04790 A1 | 1/2001 | |
| WO | WO 03/001435 A1 | 1/2003 | |
| WO | WO 2004/038613 A1 | 5/2004 | |
| WO | WO 2005/114476 A1 | 12/2005 | |

OTHER PUBLICATIONS

Haynes Repair Manuals, Mar. 25, 2002, retrieved Dec. 4, 2008 from www.archive.org, url http://web.archive.org/web/20020325061432/http://haynes.com/.*

Beis, J. S., et al., "Shape Indexing Using Approximate Nearest-Neighbour Search in High-Dimensional Spaces," CVPR '97, 1997, 7 pages.

Fei-Fei, L., et al., "Learning Generative Visual Models from Few Training Examples: An Incremental Bayesian Approach Tested on 101 Object Categories," GMBV04, 2004, pp. 1-9.

Kovesi, P., "Image Features from Phase Congruency," Videre: Journal of Computer Vision Research, 1999, pp. 1-27, vol. 1, No. 3, The MIT Press.

Lakshmi, S., "Cell Phones, Billboards Play Tag," Jul. 10, 2003, 3 pages, [online] [retrieved on May 12, 2005] Retrieved from the Internet: <URL: http://www.wired.com/news/print/0,1294,59548,00.html>.

Lowe, D. G., "Object Recognition from Local Scale-Invariant Features," Proceedings of the International Conference on Computer Vision, Sep. 1999, pp. 1150-1157.

Takeuchi, Y., et al., "Evaluation of Image-Based Landmark Recognition Techniques," The Robotics Institute, Carnegie Mellon University, CMU-RI-TR-98-20, Jul. 1998, pp. 1-16.

Viola, P., et al., "Rapid Object Detection Using a Boosted Cascade of Simple Features," Proceedings of the IEEE Conference on Computer Vision and Pattern Recognition, Dec. 2001, pp. 1-9.

Wiskott, L., et al., "Face Recognition by Elastic Bunch Graph Matching," IEEE Transactions on Pattern Analysis and Machine Intelligence, Jul. 1997, pp. 775-779, vol. 19, No. 7.

Yang, J., et al., "An Automatic Sign Recognition and Translation System," Workshop on Perceptive User Interfaces (PUI'01), Nov. 2001, 8 pages.

Zhang, J., et al., "A PDA-Based Sign Translator," Proceedings of the Fourth IEEE International Conference on Multimodal Interfaces (ICMI'02), Oct. 14-16, 2002, pp. 217-222.

PCT International Search Report and Written Opinion, PCT/US2005/016776, Aug. 23, 2005, 11 pages.

* cited by examiner

IMAGE BASE INQUIRY SYSTEM FOR SEARCH ENGINES FOR MOBILE TELEPHONES WITH INTEGRATED CAMERA

A person sees an object and his or her memory immediately provides information related to the object. A system that emulates, or even expands upon, this ability would be extremely useful.

Modern image recognition processes allow ever-better recognition of objects, landscapes, faces, symbols, strings of letters, etc. in images. More and more cameras are connected to devices that are connected to remote data transmission networks. Such a configuration supports the following application. With the camera in a terminal (1), for example, in a mobile telephone, an image or a short sequence of images is recorded. This image (2) or these images are then sent to a server computer (7) by means of remote data transmission (3). In the server computer, an image recognition process (4) is run that converts the image information into symbolic information (5), for example, plain text. For example, the image recognition process may recognize that the Eiffel Tower can be seen in the image. The remaining process functions in a manner similar to a traditional search engine (6) on the Internet. The server computer sends the user back a list with "links" to database entries or web sites containing information about the object (8) shown.

1. IMAGE RECOGNITION

Figure 1:
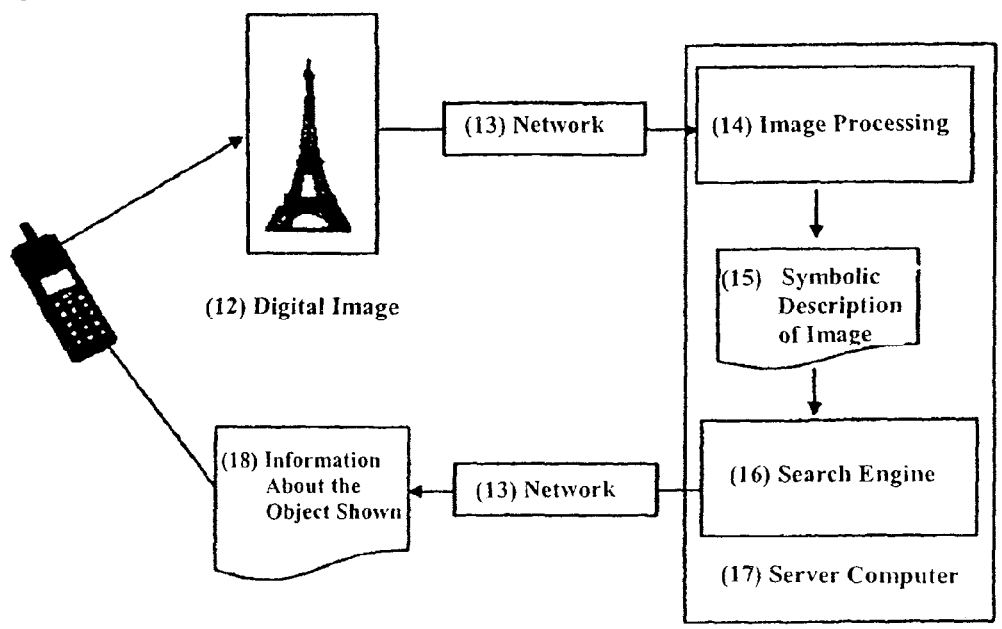
FIG. 1 is a block diagram of an example imaged-based information retrieval system according to various embodiments of the present disclosure.
Figure 2:
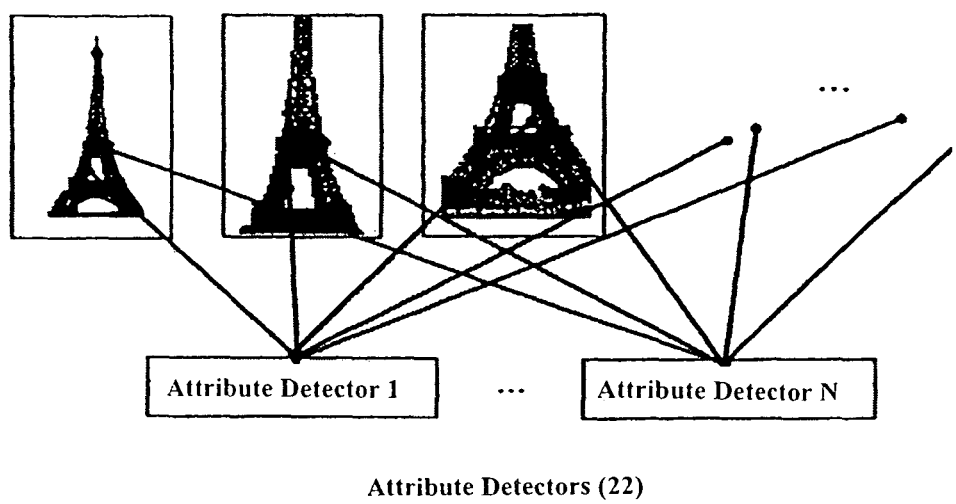
FIG. 2 is an illustration of example training images and attribute detectors of the imaged-based information retrieval system of FIG. 1.
Figure 3:
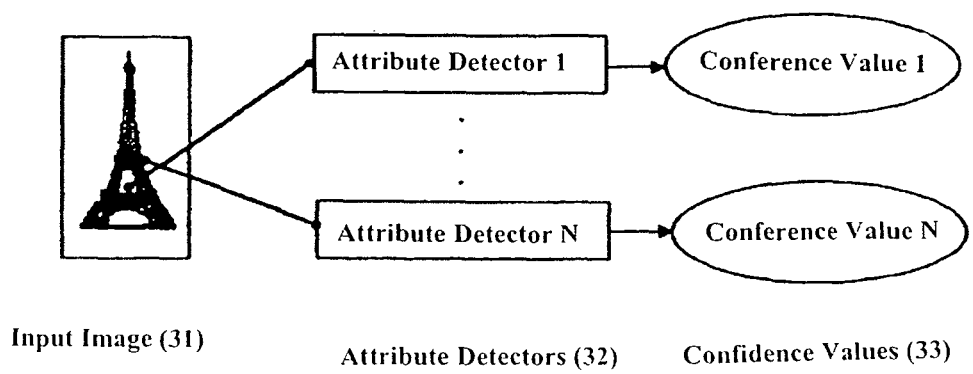
FIG. 3 is another illustration of an example training image and attribute detectors of the imaged-based information retrieval system of FIG. 1.

This section provides a rough overview of a possible method of object recognition. A more precise description of object recognition processes is described in the following publications: J. Buhmann, M. Lades, and C. v.d. Malsburg, "Size and Distortion Invariant Object recognition by Hierarchical Graph Matching," in Proceedings of the IJCNN International Joint Conference on Neural Networks, San Diego 1990, pages II-411-416 and "High-Level Vision: Object Recognition and Visual Cognition," Shimon Ullman, MIT Press; ISBN: 0262710072; Jul. 31, 2000. Automatic character recognition processes are described in "Optical Character Recognition: An Illustrated Guide to the Frontier," Kluwer International Series in Engineering and Computer Science, 502, by Stephen V. Rice, George Nagy, Thomas A. Nartker, 1999.

1.1 Structure of an Object Representation

Most object recognition processes that are in use today use a number of example images (21) to train attribute detectors (22) adapted to the object.

1.2 Recognition

In recognition, the trained attribute detectors (32) are used to find the attributes they represent in an input image (31). This occurs by means of a search process. Each attribute detector outputs a confidence value that states how well it recognizes the attribute it represents from the image. If the accumulated confidence values (33) from all of the attribute detectors exceed a predetermined threshold value, it is assumed that the object was recognized.

2. EXEMPLARY EMBODIMENTS

Naturally, automatic image recognition is still a long way from achieving the abilities of human vision. Therefore, we must first limit ourselves to situations that may be easily handled by existing image processing systems. In the following, I will describe a series of fields of application and discuss their specific difficulties.

City and Museum Guides

Visual recognition of buildings is easily attainable with today's methods. It is of course helpful if the user photographs the building in a frontal and vertical manner rather than from an oblique angle. Moreover, image recognition may be supported by using positioning information as well. Many telephones are equipped with GPS (Global Positioning System) such that it is possible to know the location of the telephone within a few meters at all times. This information can be used in image processing to limit consideration to only the buildings or building details that are nearby. Because the building ought to be recognizable at different times of the day, it is important to ensure when constructing the visual representation that appropriate image material must be incorporated. For most image recognition processes, this means that several pictures should be taken under various lighting conditions and these pictures should be used in constructing the models.

It would also be very simple to construct a universal art guide that would provide information about a painting, for example. Because pictures are two-dimensional, recognition is significantly simpler in this application.

Product Information

Another category of objects is products such as automobiles, books, or toys. If the user sees a model of automobile that he or she finds interesting, the user can simply take a picture of it and, for example, be pointed to a corresponding web site with more product information. Again, in the early phases of such a service, it will be useful if the user takes photographs from exact frontal or side views and sends them to the server computer. In later versions, when the pose invariance has been improved, the user will be less restricted. It is important for the image-based search service to be structured in such a way that, similar to the current World Wide Web, it is possible for every provider of information to offer an image-based search function for his or her web site. In this manner, it is possible to easily ensure that an image-based search function is available for many products because automobile manufacturers, for example, have a significant interest in their latest model being recognizable by imaging techniques.

Text Recognition

Another useful service lies in offering text recognition. For a person traveling to Tokyo or Paris who is not familiar with the local language, it would be very valuable to be able to point his or her camera at a sign and receive a translation and other information about the recognized text. If, for example, a person is standing in front of a sushi bar in Tokyo, it would be very valuable to be able to read the corresponding entry in a restaurant guide immediately and without additional effort. This is a particularly convenient solution to enable visitors who cannot read Japanese characters to access additional information.

Face Recognition

Face recognition is another special case. People who, for whatever reason, would like others to be able to find out more about them quickly may make images of their face available that could then be used in image recognition.

The Fully Constructed System

The list of application fields could be continued for a long time. Catalogs for antiquities and identification books for plants and animals could be made significantly more efficient using the system described above. Or a person could visualize part of a device for which he or she needs a replacement or more information. The person could simply take a picture and be quickly referred to its identification and manufacturer or to the corresponding section of a user manual. A system that provides additional information about advertising billboards is another application. In each of these cases, the user simply takes a picture of the object in question and sends it to the computer on which the image recognition system is running. The image recognition system sends corresponding symbolic information describing the object to the search engine, which finally selects the information that is sent back to the user.

In the completed stage of construction, a system results that could be equated with an extremely visual memory. Each object, each piece of text, each symbol, each face, and finally a large number of views of the surface of the earth are stored in the system and are continually kept up-to-date by the users. Ultimately, the result is a global system that stores our knowledge about the things on our planet and makes them available on a constant basis.

The invention claimed is:

1. A system for image-based information retrieval from search engines, characterized by a) a terminal with a built-in camera that is connected to a remote data transmission network; b) a server computer on which an object recognition program is running, which analyses images sent to it and provides them with a symbolic indexing; c) a search engine that uses the indexed image to find information about the image and sends it back to the terminal.

2. The system as described under 1) that is designed for mobile telephones or portable computers that have a built-in camera.

3. A city or museum guide that uses the system described under 2) to provide a user with information about objects of which he or she has previously taken a picture.

4. The system as described under 3) in which positioning information is also used to appropriately limit the image recognition system.

5. The system as described under 2) that provides product information about products that have been previously photographed with the mobile camera.

6. The system as described under 2) in which the image recognition system is also able to recognize text characters or symbols.

7. The system as described under 2) in which the system is, in particular, able to recognize faces.

8. The system as described under 2) that is used to provide the user with additional information about advertising billboards.

9. An electronic user handbook that uses a system as described under 2) to quickly navigate access to corresponding sections of the handbook.

10. The system as described under 2) that allows providers of information to independently make new entries in the image processing system for the purpose of allowing their data to be retrieved by means of image entry.

11. A computer implemented system for image-based searching, comprising:
    a computer server, communicatively coupled with a network, that receives an input image from a user device communicatively coupled with the network;
    an image recognition system executed by the computer server and adapted to:
        determine a plurality of graphical attributes of the input image;
        match the input image to a reference image from a plurality of reference images stored in a storage medium, based on the plurality of graphical attributes of the input image and the reference images, each of the reference images having an associated symbolic identifier; and
        associate a symbolic identifier to the input image based on the symbolic identifier associated with the matching reference image;
    a search engine executed by the computer server and adapted to receive a query and to retrieve a set of search results associated with the query; and
    a query processing system executed by the computer server and adapted to:
        receive the symbolic identifier of the input image from the image recognition system;
        provide the symbolic identifier to the search engine as a query, and to receive a set of search results associated with the symbolic identifier; and
        transmit, via the network, a plurality of the search results to the user device.

12. The system of claim 11, wherein the user device comprises a mobile telephone having an integrated camera.

13. The system of claim 11, wherein:
    the server receives a geographic location of the user device in association with the input image; and
    the image recognition system is further adapted to match the input image to a reference image from the plurality of reference images based on the geographic location of the user device.

14. The system of claim 11, wherein the image recognition system further includes a character recognition system.

15. The system of claim 11, wherein the image recognition system further includes a facial recognition system.

16. The system of claim 11, wherein the image recognition system is further adapted to:
    receive a plurality of images from the user device;
    store the received images as reference images; and
    match an input image subsequently received from the user device to at least one of the reference images received from the user device.

17. A computer implemented method for image-based searching, comprising:
    receiving at a computer server, an input image from a user device remotely located from the server;
    providing from the computer server the input image to an image recognition system;

receiving at the computer server from the image recognition system a symbolic identifier associated with the input image;

providing from the computer server the symbolic identifier to a search engine as a query;

receiving at the computer server from the search engine a set of search results associated with the symbolic identifier; and transmitting from the computer server a plurality of the search results to the user device.

18. A computer implemented method for image-based searching at a computer server, the method comprising:

receiving an input image from a user device remotely located from the server;

determining a plurality of graphical attributes represented in the input image;

matching the input image to a reference image from a plurality of reference images stored in a storage medium, based on the plurality of graphical attributes of the input image and the reference images, each of the reference images having an associated symbolic identifier; and associating a symbolic identifier to the input image based on the symbolic identifier associated with the matching reference image;

processing the symbolic identifier as search query to retrieve, from a search engine, a set of search results associated with the symbolic identifier; and transmitting a plurality of the search results to the user device.

19. The method of claim 18, wherein the user device comprises a mobile telephone having an integrated camera.

20. The method of claim 18, wherein the image recognition system is further adapted to:

receive a plurality of reference images from the user device;

store the received images as reference images; and match an input image subsequently received from the user device to at least one of the reference images received from the user device.

21. The method of claim 18, further comprising receiving a geographic location of the user device through the network.

22. The method of claim 21, wherein the image recognition system is further adapted to match the input image to a reference image from the plurality of reference images based on the geographic location of the user device.

23. The method of claim 18, wherein the image recognition system further includes a character recognition system.

24. The method of claim 18, wherein the image recognition system further includes a facial recognition system.

25. The method of claim 18, wherein the image recognition system is further adapted to enable transmission of reference images, for use by the image recognition system, to the storage medium.

26. The method of claim 18, wherein selecting a matching reference image from a plurality of reference images stored in a storage medium comprises:

determining the graphical attributes in the input image represented by a plurality of trained attribute detectors;

aggregating a plurality of confidence values received from the plurality of trained attribute detectors; and determining the matching reference image where the aggregated plurality of confidence values exceed a predetermined threshold value.

27. The method of claim 18, wherein the search results comprise links to websites, contact information, product information, translations of recognized characters, and other information related to the input image.

28. A computer implemented method for image-based searching of product information, comprising:

receiving an input image from a user device remotely located from the computer server;

processing the input image of a manufactured product on an image recognition system to obtain a symbolic identifier identifying the manufactured product in the input image, the symbolic identifier comprising at least one of a product name or a product identification number, or a product code;

providing the symbolic identifier associated with the input image to the search engine as a query;

receiving a set of search results associated with the symbolic identifier, the search results including at least one document descriptive of the manufactured product in the input image; and transmitting via the network, a plurality of the search results to the user device.

29. A computer implemented method for image-based identification of buildings, comprising:

receiving an input image of a building from a user device remotely located from the computer server;

processing the input image of the building on an image recognition system executed by the computer server to obtain a symbolic identifier identifying the building in the input image, the symbolic identifier comprising at least one of a building name or a building location;

providing the symbolic identifier associated with the input image to a search engine as a query;

receiving a set of search results associated with the symbolic identifier, the search results including at least one document descriptive of the building in the input image; and transmitting via the network, a plurality of the search results to the user device.

30. A computer implemented method for image-based language translation, comprising:

receiving an input image from a user device remotely located from the computer server;

processing the input image on a character recognition system, executed by the computer server to obtain text data indicative of the text in the input image, the text data in a first language; and providing the text data and an indication of a user-specified second language to a translation system;

receiving from the translation system a translation of the text data into a second language; and transmitting, via the network, the translation to the user device.

31. A computer implemented method for image-based searching of human faces, comprising:

receiving an input image of a human face on a computer server communicatively coupled with a network from a user device communicatively coupled with the network; and processing the input image of the human face on a facial recognition system to obtain a symbolic identifier identifying the human face in the input image, the symbolic identifier comprising a name of the person having the human face in the input image;

providing the symbolic identifier associated with the input image to a search engine as a query;

receiving a set of search results associated with the symbolic identifier, the search results including at least one document descriptive of the person in the input image; and transmitting via the network, a plurality of the search results to the user device.

\* \* \* \* \*

UNITED STATES PATENT AND TRADEMARK OFFICE
CERTIFICATE OF CORRECTION

PATENT NO. : 8,421,872 B2  Page 1 of 1
APPLICATION NO. : 10/783378
DATED : April 16, 2013
INVENTOR(S) : Hartmut Neven, Sr.

It is certified that error appears in the above-identified patent and that said Letters Patent is hereby corrected as shown below:

Title Page: insert

--FOREIGN PATENT DOCUMENTS

WO 02/082799A2
WO 02/082799A3
EP 0920179--

Signed and Sealed this
Sixth Day of August, 2013

Teresa Stanek Rea
*Acting Director of the United States Patent and Trademark Office*